United States Patent [19]
Cadotte

[11] Patent Number: 5,832,640
[45] Date of Patent: Nov. 10, 1998

[54] CALENDRIC DEVICE WITH SENSIBLE INDICIA

[76] Inventor: Raymond Cadotte, 3232 N. Apache St., Kingman, Ariz. 86401

[21] Appl. No.: 781,859

[22] Filed: Jan. 10, 1997

[51] Int. Cl.⁶ ..................................................... G09D 3/00
[52] U.S. Cl. ................................. 40/107; 40/111; 40/119
[58] Field of Search ............................. 40/107, 111, 114, 40/119, 121; 283/2

[56] References Cited

U.S. PATENT DOCUMENTS

| | | | |
|---|---|---|---|
| 327,532 | 10/1885 | Cox | 283/2 |
| 788,746 | 5/1905 | Zaehringer | 40/107 |
| 801,887 | 10/1905 | Low | 40/114 |
| 1,264,213 | 4/1918 | Shambaugh | 40/119 |
| 1,537,891 | 5/1925 | Shedd | 283/2 |
| 2,131,482 | 9/1938 | Post . | |
| 2,248,591 | 7/1941 | Sow . | |
| 2,274,813 | 3/1942 | Vogel . | |
| 2,409,347 | 10/1946 | Dootson . | |
| 2,464,461 | 3/1949 | Potter . | |
| 2,548,553 | 4/1951 | Neves . | |
| 3,142,123 | 7/1964 | Vierling . | |
| 3,190,022 | 6/1965 | Maitre . | |
| 3,259,311 | 7/1966 | Sama et al. . | |
| 3,518,825 | 7/1970 | Nissen . | |
| 3,717,299 | 2/1973 | Penn . | |
| 3,964,196 | 6/1976 | Ureta | 40/107 |
| 5,289,649 | 3/1994 | Perez . | |

FOREIGN PATENT DOCUMENTS 740926  11/1955  United Kingdom ..................... 40/111

*Primary Examiner*—Brian K. Green
*Attorney, Agent, or Firm*—Parsons & Goltry; Robert A. Parsons; Michael W. Goltry

[57] ABSTRACT

A calendric device, including a calendric system for displaying and indicating any day of any week of any month of any year and an interactive system associated with the calendric system and for allowing a user to randomly select and subsequently adopt one of a plurality of sensible indicia on one or more of a group including a day, a week, a month and a year.

1 Claim, 1 Drawing Sheet

CALENDRIC DEVICE WITH SENSIBLE INDICIA

BACKGROUND OF THE INVENTION

1. Field of the Invention

This invention relates generally to the field of calendaring.

More particularly, this invention relates to calendric devices for dividing time over extended periods, such as days, weeks, months or years.

2. Prior Art

A calendar is normally defined as any system or device for dividing time over extended periods, such as days, months, or years, and arranging such divisions in a definite order. A calendric system is essential for regulating the basic affairs of civil life and for reckoning time for religious observances and scientific purposes.

There are several standard units common to virtually all calendric systems. The day is the fundamental unit of computation in any calendar. It is to some extent a natural division of time, since it is based on the length of time it takes the Earth to rotate once on its axis; but its subdivision into a number of equal intervals of, for example, twenty four (24) hours is purely artificial.

The week is also an artificial division of time and cannot be correlated with any astronomical or natural phenomena except insofar as it is a closed cycle of days. The seven-day week that is now universally used may have been derived from the mystical significance attached to the number seven. Support for this view may perhaps be derived from the use of the names of gods and goddesses for each of the days.

The month is a calendric period derived from lunation, the time interval in which the Moon completes a full cycle of its phases. This period, known as the synodic month, consists of 29.53059 days. As the earliest adopted of the longer calendar periods, it had a significance in ancient religious observance.

The year is based on the length of time it takes the Earth to orbit the Sun. There are several ways to measure this period, but the most common is the tropical year, which is the interval between successive passages of the Sun through the vernal equinox. The year thus computed consists of 365.242199 mean solar days, i.e., 365 days 5 hours 48 minutes 46 seconds.

Unfortunately, the tropical year and the synodic month are incommensurable: 12 lunations come to 354.36706 days, almost 11 days less than a tropical year. In addition, neither the tropical year nor the synodic month is evenly divisible by the length of the day. Therefore, to compile or maintain any calendar that keeps in step with the Moon's phases or with the seasons, it is necessary to insert days at appropriate intervals. These extra days are known as intercalations. The most familiar example of an intercalation is the additional day given to February every fourth year, which is commonly referred to as leap year.

With the exception of the Muslim calendar and the traditional Hindu and Jewish calendars used primarily for religious purposes, the primary calendric system largely in use today is the Gregorian calendar. There are many forms of Gregorian calendars presently in use which incorporate a variety mechanical features suitable for aiding a user in easily adjusting the calendar from year to year, month to month, and/or from day to day. A feature common to known present calendric devices is that they normally operate only as a calendar. In this regard, many calendars that people use in the home, workplace and other venues, are uninteresting and limited in their utility thus becoming largely unnoticed and not infrequently completely unused.

Thus, there is a continuing and highly advantageous need in the art for a calendric device that incorporates interactive elements for enhancing utility, interest and quality of life.

Accordingly, it is an object of the present invention to provide a new and improved calendric device.

Another object of the present invention is to provide a calendric device having interactive elements.

And another object of the present invention is to provide a calendric device that enhances and fosters good spirits and good will.

Still another object of the present invention is to provide a calendric device that is easy to use.

Yet another object of the instant invention is the provision of relieving stress.

Yet still another object of the instant invention is to provide a calendric device that is inexpensive.

And a further object of the invention is to provide a calendric device that is easy and inexpensive to construct.

Still a further object of the immediate invention is to provide a calendar having interactive elements that may be used in a variety of different ways to accommodate the needs and desires of the user.

Yet a further object of the invention is to provide a calendric device that is fun to use.

And still a further object of the invention is the provision of enhancing and fostering happiness.

And yet still a further object of the invention is to provide a method of determining any day of any week of any month of any year and of adopting a feeling, mood or behavioral characteristic on one or more of a group including a day, a week, a month and a year.

SUMMARY OF THE INVENTION

Briefly, to achieve the desired objects of the instant invention in accordance with a preferred embodiment thereof, provided is a calendric device, comprising a first assembly for displaying and indicating any day of any week of any month of any year, and a second assembly associated with the first assembly and for allowing a user to randomly select and subsequently adopt one of a plurality of sensible indicia on one or more of a group including a day, a week, a month and a year.

Regarding a preferred embodiment, the second assembly includes an element having a surface, the plurality of sensible indicia carried by the surface and arranged in a pattern. Further included is a member having a proximal end movably, preferably spinably, mounted to the element proximate the surface and a distal end extending outwardly therefrom and generally corresponding to the pattern, the distal end being movable along the pattern upon application of external force to the member, the distal end to reside proximate one of the plurality of sensible indicia upon discontinuance of the movement of the member. Each of the plurality of sensible indicia may correspond to one or more of a group including, but not limited to, an emotion, a feeling, a mood and a behavioral characteristic.

In a specific embodiment, the first assembly includes a plurality of sheets arranged in series, each one of the sheets including a plurality of columns generally corresponding to the days of the month and a plurality of rows generally corresponding to the weeks of the month. Each one of the plurality of columns may be associated with another of a plurality of sensible indicia that a user may observe and adopt on a day of a week. Furthermore, each one of the other plurality of sensible indicia may correspond to one or more of a group including an emotion, a feeling, a mood and a behavioral characteristic.

The present invention additionally provides a method of determining any day of any week of any month of any year and of adopting a sensible indicia on one or more of a group including a day, a week, a month and a year. The method is generally comprised of the steps of providing a first assembly for displaying and indicating any day of any week of any month of any year, providing a second assembly for allowing a user to randomly select one of a plurality of sensible indicia, observing one or more of a group including a day, a month, a week and a year with the first assembly, actuating the second assembly to randomly select one of the plurality of sensible indicia, and adopting the one of the plurality of sensible indicia on one or more of the group including the day, the week, the month and the year. The step of adopting the one of the plurality of sensible indicia may further include the step of adopting one or more of a group including an emotion, a feeling, a mood and a behavioral characteristic.

The present invention still further provides a method of determining any day of any week of any month of any year and of adopting a sensible indicia on a day of a week of a month of a year. The method is generally comprised of the steps of providing a first assembly for displaying and indicating any day of any week of any month of any year, associating a sensible indicia of a plurality of sensible indicia with any day of any week of any month of any year, observing a day of a week of a month of a year with the first assembly, observing the sensible indicia associated with the day, and adopting the sensible indicia on the day. The step of adopting the sensible indicia may further include the step of adopting one or more of a group including an emotion, a feeling, a mood and a behavioral characteristic.

BRIEF DESCRIPTION OF THE DRAWINGS

The foregoing and further and more specific objects and advantages of the instant invention will become readily apparent to those skilled in the art from the following detailed description of preferred embodiments thereof taken in conjunction with the drawings in which.

DETAILED DESCRIPTION OF PREFERRED EMBODIMENTS

Figure 1:
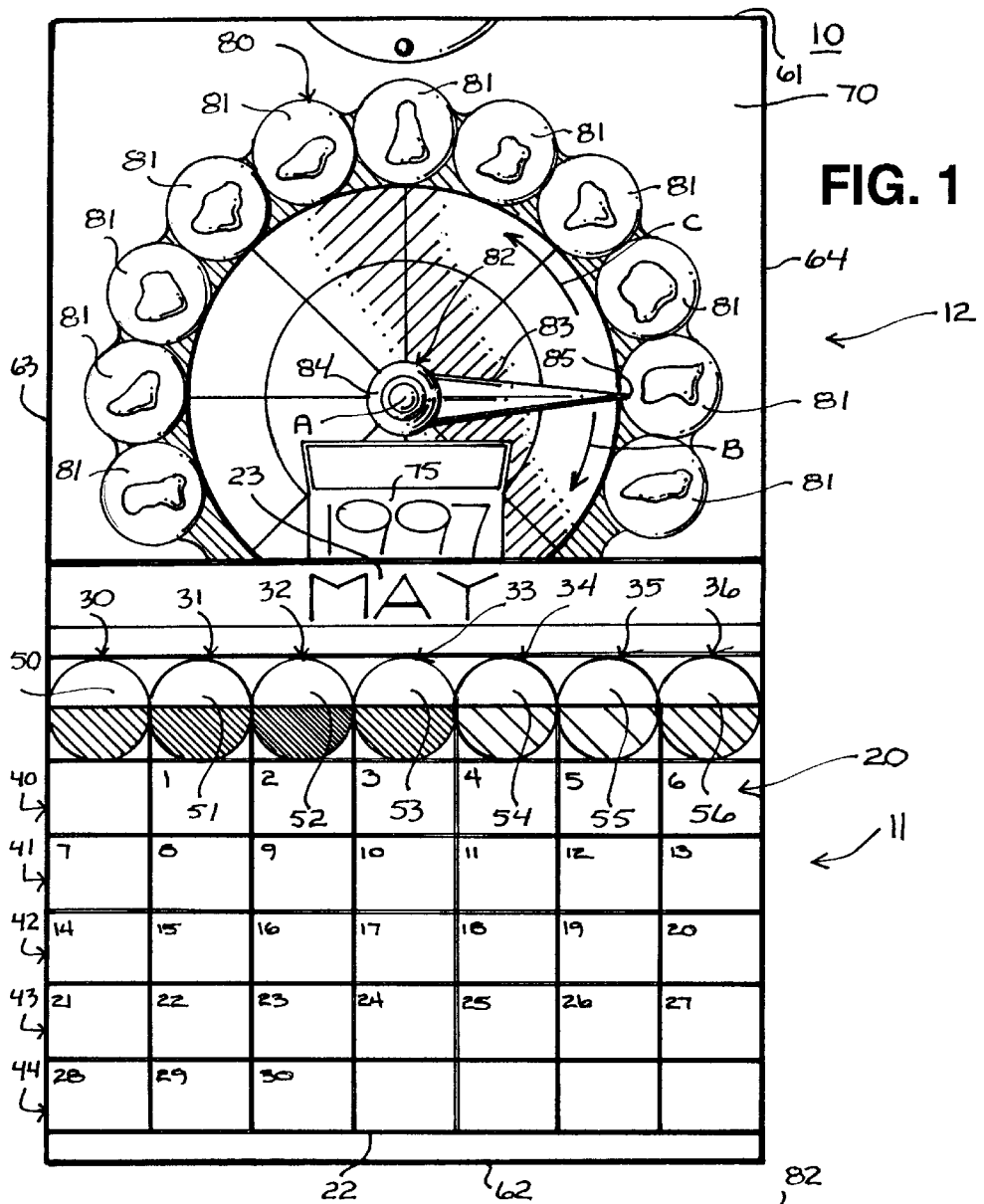
FIG. 1 illustrates a calendric device having interactive elements for allowing a user to randomly select one/of a plurality of sensible indicia, in accordance with a preferred embodiment of the present invention.

Turning now to the drawings, in which like reference characters indicate corresponding elements throughout the several views, attention is first directed to FIG. 1 illustrating a calendric device generally designated at 10. Calendric device 10 is generally comprised of a first assembly 11 for displaying and indicating any day of any week of any month of any year, and second assembly 12 associated with first assembly 11 and for allowing a user to randomly select and subsequently adopt one of a plurality of sensible indicia on one or more of a group including a day, a week, a month and a year. In a further and more specific aspect, first assembly 11 of calendric device 10 is of a variety typical of many known and conventional calendars operative for displaying and indicating the days, weeks and months of the year. In this manner, first assembly 11 may be provided in any desired form as desired by a user, further details of which herein chosen for the purposes of a preferred embodiment will be discussed presently. Furthermore, second assembly 12 provides interactive elements which allow a user to engage for enhancing the quality of living during any day, any week, any month, and any year. As will be shown throughout this discussion, second assembly 12 is a highly advantageous and highly beneficial feature of the present invention which contributes to the ability of users to enhance the quality of life.

With continuing reference to FIG. 1, attention is directed to first assembly 11. Pursuant to the foregoing discussion, first assembly 11 may be provided in a variety of formats and configurations suitable for displaying and indicating any day of any week of any month of any year. With respect to the present discussion, first assembly 11 is generally comprised of a plurality of sheets 20 arranged in series. Although sheets 20 may be arranged in any desired orientation, they are disclosed herein as stacked together one on top of the other, an arrangement well known to those having regard to the art. Sheets 20 are preferably each substantially planar and may be constructed of any desired and suitable material such as paper, plastic or the like. Sheets 20 disclosed herein are bound together at a top edge and each freely depend therefrom and collectively terminate with a bottom edge 22. As the months pass, users may tear the sheets 20 away at top edge 21 when necessary to display the current month.

Each of the sheets 20 carry markings in the form of indicia to denote the days of a specific month in a manner consistent with the Gregorian calendric system, although this is not an essential feature to the present invention and other calendric systems may be incorporated without departing from the nature and scope hereof. In particular, the month designation of each sheet 20 is present at 23 near the top of each sheet 20 proximate top edge 21 and is generally centrally disposed, although this is not essential and the month designation may be present at other viewable locations. Sheets 20 each further include a plurality of vertical columns designated at 30, 31, 32, 33, 34, 35 and 36 and each generally corresponding to a day of the week and designated respectively as Sunday, Monday, Tuesday, Wednesday, Thursday, Friday and Saturday, respectively. Still further included are a plurality of horizontal rows designated at 40, 41, 42, 43 and 44 which intersect columns 30, 31, 32, 33, 34, 35 and 36 and each generally corresponding to a week of a month of which there are generally four.

Regarding FIG. 1, each column 30, 31, 32, 33, 34, 35 and 36 is shown associated with a sensible indicia generally designated at 50, 51, 52, 53, 54, 55 and 56. Although each sensible indicia 50, 51, 52, 53, 54, 55 and 56 may be disposed on sheet 20 at any suitable location operative to associate a designated column 30, 31, 32, 33, 34, 35, and 36, respectively, each sensible indicia 50, 51, 52, 5:3, 54, 55 and 56 is carried by sheet 20 above each respective column 30, 31, 32, 33, 34, 35, and 36 just below the month designation generally designated at 23. It will be understood that sensible indicia is generally defined as something of a kind, written or otherwise, that may be observed and understood or otherwise perceptible to the senses or to reason or understanding. In this manner, each sensible indicia 50, 51, 52, 53, 54, 55 and 56 may be of a kind suitable to be observed and then perceived or understood to evoke or trigger a specific reaction or response either involuntarily or voluntarily, depending on the sensitivity and susceptibility of a specific observer each to be taken on his or her own regard.

With respect to the present invention, each sensible indicia 50, 51, 52, 53, 54, 55 and 56 may be provided as one or more of a group including a symbol, a word, a marking, a color such as red, pink, orange, yellow, green, blue, indigo, violet or other color either primary or otherwise, or other selected marking operative to indicate, evoke or trigger one or more of a group including an emotion, a feeling, a mood and a behavioral characteristic. In particular, symbols may be selected or contrived in any manner whereupon observance, fosters preferably positive reactions or responses. Words may be chosen such as "love,", "friendship," "giving," "sharing,", "happiness," "empathy," and most certainly others that when observed and read evoke or encourage consistent emotions, feelings, moods and behavioral characteristics. Regarding colors, by their very nature they tend to evoke emotions, feelings and moods in those who observe them. For example, for some people blue can evoke feelings of freedom or leisure, red can evoke feelings of love, yellow can evoke feelings of happiness or joy and so on and so forth. In any event, for each and every person, each foregoing variety and potential other varieties of sensible indicia may represent and evoke different feelings, emotions, moods and behavioral characteristics, whether good or bad. In this regard, a user may observe a day of a week of a month of a year. Furthermore, upon observance of the specific day, the user may then observe the relevant sensible indicia associated with that particular day and then adopt or emulate the emotion, feeling, mood and/or behavioral characteristic that specific sensible indicia evokes or encourages for that specific day to foster the general happiness of the user and of people that encounter the user. To enhance the general happiness of those using calendric device 10, it is generally intended that each word, symbol, color, or other instrumentality defining each sensible indicia 50, 51, 52, 53, 54, 55 and 56 preferably evoke happy and enjoyable emotions, feelings, moods and behavioral characteristics.

With continuing reference to FIG. 1, attention is now directed to second assembly 12. Having particular significance to the present invention and pursuant to the foregoing discussion, second assembly 12, like first assembly 11, provides interactive elements which allow a user to utilize or engage for enhancing the quality of any day, any week, any month and any year. In general, second assembly 12 is comprised of an element 60 having a substantial planar configuration, a perimeter edge defined collectively by an upper edge 61, a lower edge 62, side edges 63 and 64, and a surface 70 having a substantially planar configuration. Preferably constructed of paper, plastic or other material, element 60 carries first assembly 11 proximate surface 70. Regarding the preferred embodiment, first assembly 11 is coupled or bound, either fixedly or detachably, to element 60 in any conventional and suitable manner proximate surface 70 such that top edge 21 resides intermediate upper edge 61 and lower edge 62 and bottom edge 22 resides proximate lower edge 62. In this fashion, portions of surface 70 extend upwardly from top edge 22 of first assembly 11 and carry an interactive system generally designated at 80 and operative for allowing a user to randomly select one of a plurality of sensible indicia and to adopt the one of the plurality of sensible indicia on one or more of a group including a day, a week, a month and a year. As shown in FIG. 1, the year designation of calendric device 10 is shown present at 75 just above top edge 21 and is generally centrally disposed, although this is not essential and the year designation may be present in other viewable locations.

Figure 3:
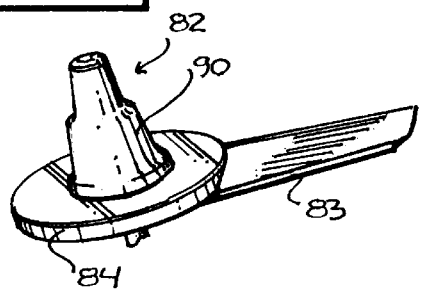
FIG. 3 illustrates a fragmented perspective view of the spinner assembly of FIG. 3.
Figure 2:
FIG. 2 illustrates a side elevational of a spinner assembly of FIG. 1.

In particular, interactive system 80 is generally comprised of a plurality of sensible indicia 81 arranged in a pattern upon surface 70, and a spinner or indicator assembly 82 mounted to element 60 of which a user may actuate to randomly selected one of the plurality of sensible indicia 81. Although interactive system 80 may be arranged in any suitable form and pattern, in the preferred embodiment, and with additional reference to FIG. 2 and FIG. 3, spinner assembly 82 includes a member or indicator 83 having a proximal end 84 and a distal 85. Preferably constructed of plastic or other similar material, member 83 is generally elongate and tapers outwardly toward distal end 85. Proximal end 84 is spinably coupled to a base element 90 of which is mounted to an aperture (not shown) formed at a generally central location through that portion of element 60 extending upwardly from top edge 21. In this manner of assembly, member 83 resides in a plane substantially parallel to a plane of surface 70 of element 60 and is spinably rotatable along axis of rotation A in FIG. 1. The plurality of sensible indicia 81 are spaced apart and arranged radially outwardly from proximal end 84 of member 83 and are further disposed proximate those portions of the perimeter edge of element 60 extending upwardly from top edge 21 of first assembly 11 such that distal end 85 of member 83 generally corresponds to the plurality of sensible indicia 81.

Like the sensible indicia discussed in combination with first assembly 11, each of the plurality of sensible indicia 81 is generally defined as something of a kind, written or otherwise, that may be observed and understood or otherwise perceptible to the senses or to reason or understanding. In this manner, each sensible indicia 81 may be of al kind suitable to be observed and then perceived or understood to evoke or trigger a specific reaction or response either involuntarily or voluntarily, depending on the sensitivity and susceptibility of a specific observer, each to be taken on his or her own regard.

With respect to the present invention, and like the sensible indicia discussed in combination with first assembly 11, each sensible indicia 81 may be provided as one or more of a group including a symbol, a word, a marking, a color such as red, pink, orange, yellow, green, blue, indigo, violet or other color either primary or otherwise, or other selected marking that may be observed and evoke or trigger a positive feeling, mood or behavioral characteristic. In this regard, on any day, week, and/or year, a user may apply external force to member 83 of spinner assembly 82 and spin member 83 either in the clockwise direction as indicated by the arcuate arrowed line B in FIG. 1, or the counterclockwise direction as indicated by the arrowed line C. After member 83 is so actuated, it will eventually stop rotating and distal end 85 will come to rest randomly proximate one of the plurality of sensible indicia 81. The user may then observe the sensible indicia distal end points to or otherwise corresponds to and then adopt or emulate the feeling, mood or behavioral characteristic evoked or triggered by the specific sensible indicia 81. Depending upon the desires of the user, the user may then observe one or more of a group including a day, a week, a month and a year and adopt or emulate one or more of a group including an emotion, a feeling, a mood and a behavioral characteristic evoked from the specific sensible indicia 81 for that specific day, week, month, and/or year. To enhance the general happiness of those using calendric device 10, it is generally intended that each sensible indicia 81 preferably evoke happy or enjoyable feelings and/or moods.

It will be generally understood that calendric device 10 may be positioned in any suitable manner and in any suitable place so as to be easily accessed and easily viewable by onlookers. In this respect, calendric device 10 may be attached to a wall or other elevated location in a manner reminiscent of many conventional wall calendars, or may be positioned upon a desk or a table reminiscent of desk-type calendars.

In summary, what has been disclosed is a calendric device that may be used not only for displaying and indicating the days of the weeks of the months of the years, but also for allowing a user to randomly selected sensible indicia for a specific day, week, month, and/or year. The sensible indicia preferably is of the sort that evokes happy and joyful emotions, feelings, moods and behavioral characteristics such as love, happiness, friendship, goodwill, gentleness, understanding, peace, giving, empathy, and other characteristics that can not only be comforting and emotionally healthy for the user, but also pleasing and admirable by friends, family acquaintances and others who encounter the user on the specific day, week, month, and/or year during which he or she is adopting the emotion, feeling, mood or behavioral characteristic observed from the sensible indicia of the calendric device. Because the world is becoming an increasingly hostile place in which to live, it will be readily understood by those having regard to the art that calendric device 10 is a notable improvement in the art for helping people to become emotionally happier and emotionally and physically healthier from day to day, week to week, month to month and year to year.

The present invention has been described above with reference to a preferred embodiment. However, those skilled in the art will recognize that changes and modifications may be made in the described embodiments without departing from the nature and scope of the present invention. Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A method of determining any day of any week of any month of any year and of adopting one or more of a group including an emotion, a feeling, a mood and a behavioral characteristic on a given day, a given week, a given month or a given year, the method comprising the steps of:

provided a calendric assembly having indicia for displaying and indicating any day of any week of any month of any year;

providing a plurality of sensible indicia, each one of the plurality of sensible indicia corresponding to one or more of a group including an emotion, a feeling, a mood and a behavioral characteristic;

providing an indicator;

mounting the indicator adjacent the plurality of sensible indicia for movement upon application of external force;

observing one or more of a group including a day, a month, a week and a year of the indicia;

applying external force to the indicator to impart movement to the indicator;

waiting for the indicator to come to a halt in a stopped position;

observing one of the plurality of sensible indicia corresponding with the indicator in the stopped position; and adopting one or more of the group including the emotion, the feeling, the mood and the behavioral characteristic corresponding with the one of the plurality of sensible indicia corresponding with the indicator in the stopped position on a given day, a given week, a given month or a given year.

\* \* \* \* \*